United States Patent
Powell, III

(10) Patent No.: US 10,491,569 B1
(45) Date of Patent: Nov. 26, 2019

(54) SECURE TRANSFER OF INDEPENDENT SECURITY DOMAINS ACROSS SHARED MEDIA

(71) Applicant: AlteredNets Cyber Solutions LLC, Penfield, NY (US)

(72) Inventor: Nelson H. Powell, III, Penfield, NY (US)

(73) Assignee: Alterednets Cyber Solutions LLC, Penfield, NY (US)

( * ) Notice: Subject to any disclaimer, the term of this patent is extended or adjusted under 35 U.S.C. 154(b) by 259 days.

(21) Appl. No.: 15/348,272

(22) Filed: Nov. 10, 2016

Related U.S. Application Data

(60) Provisional application No. 62/253,180, filed on Nov. 10, 2015.

(51) Int. Cl.
*H04L 29/06* (2006.01)
*H04L 29/08* (2006.01)

(52) U.S. Cl.
CPC ........ *H04L 63/0428* (2013.01); *H04L 63/162* (2013.01); *H04L 69/324* (2013.01)

(58) Field of Classification Search
CPC .. H04L 63/0428; H04L 63/162; H04L 69/324
(Continued)

(56) References Cited

U.S. PATENT DOCUMENTS

| 6,606,706 B1 * | 8/2003 | Li | H04L 12/18 713/153 |
|---|---|---|---|
| 6,684,253 B1 | 1/2004 | Whitaker et al. | |

(Continued)

FOREIGN PATENT DOCUMENTS

| EP | 2469771 A1 | 6/2012 |
|---|---|---|
| WO | 2004028069 A1 | 4/2004 |

(Continued)

OTHER PUBLICATIONS

Unknown; "IEEE Standard for Local and metropolitan area networks: Media Access Control (MAC) Security"; IEEE Computer Society; IEEE Std. 802.1AE-2006; Published Aug. 18, 2006; Copyright 2006 Institute of Electrical and Electronics Engineers, Inc.; pp. 154.

*Primary Examiner* — Kambiz Zand
*Assistant Examiner* — Zoha Piyadehghibi Tafaghodi
(74) *Attorney, Agent, or Firm* — Hoffman Warnick LLC

(57) ABSTRACT

This disclosure provides systems, methods, and computer program products for secure transfer of security domains across shared media. A secure domain interface is associated with a security domain. The secure domain interface receives a secure network data packet and appends a first data frame. A security interface receives the internal data packet and appends a second data frame to the internal data packet. The second data frame generates an open network data frame securely including payload and routing information from the secure network data packet. The security interface receives open network data frames, authenticates and extracts internal data packets, and routes internal data packets to the secure domain interface. The secure domain interface receives internal data packets, authenticates and extracts secure network data packets, and routes secure network data packets to secure network devices in the security domain.

20 Claims, 8 Drawing Sheets

(58) Field of Classification Search
USPC .......................................................... 713/161
See application file for complete search history.

(56) References Cited

U.S. PATENT DOCUMENTS

| | | | |
|---|---|---|---|
| 7,607,011 B1 | 10/2009 | Johnson et al. | |
| 7,864,762 B2 | 1/2011 | Carrasco | |
| 7,904,711 B2 | 3/2011 | Mackey et al. | |
| 8,161,529 B1 | 4/2012 | Bortz et al. | |
| 8,181,009 B2 | 5/2012 | Watts et al. | |
| 8,250,360 B2 | 8/2012 | Winig | |
| 8,925,064 B1 | 12/2014 | Bressler | |
| 2003/0041266 A1* | 2/2003 | Ke | H04L 12/4641 726/15 |
| 2004/0247126 A1* | 12/2004 | McClellan | H04L 9/12 380/262 |
| 2005/0213763 A1* | 9/2005 | Owen | H04L 63/0428 380/270 |
| 2007/0217431 A1 | 9/2007 | Whitaker | |
| 2008/0098143 A1 | 4/2008 | Canter et al. | |
| 2010/0095122 A1* | 4/2010 | Bettger | H04L 12/1831 713/170 |
| 2013/0061034 A1* | 3/2013 | Walheim, Sr. | H04L 63/0272 713/150 |
| 2013/0070745 A1* | 3/2013 | Nixon | H04L 45/74 370/338 |
| 2014/0226820 A1 | 8/2014 | Chopra et al. | |
| 2014/0254800 A1 | 9/2014 | Derby | |
| 2014/0341320 A1* | 11/2014 | Hua | H04B 7/0417 375/299 |

FOREIGN PATENT DOCUMENTS

| | | |
|---|---|---|
| WO | 2008039468 A2 | 4/2008 |
| WO | 2014022756 A1 | 2/2014 |

\* cited by examiner

SECURE TRANSFER OF INDEPENDENT SECURITY DOMAINS ACROSS SHARED MEDIA

BACKGROUND

The disclosure relates to systems and methods for secure network domains and, more specifically, multiplexing secure network domains over common transport media.

As enterprise networking technology has evolved, various industries have automated more aspects of their business. Business processes, data and devices are increasingly using networks due to the ease of deployment, maintenance, access, and management. With the ease of access and standardized interfaces comes the increase in security threats to a business' critical infrastructure and sensitive data. In many instances, the reduced costs in general deployment and operation are inversely disproportionate to the new cost of security.

Seeking a solution to the security risks presented by network vulnerabilities, the military directed organizations to segregate various levels of security by the physical separation of all network devices. This method of communications provides a high assurance (HA) method of data exchange while blocking outside entities from gaining access, however redundant and costly. Commercial off the shelf (COTS) equipment is inherently expensive to deploy, maintain, and upgrade for a single network; when applied to multiple security domains the number of security domains is multiplied by the cost of the hardware. Though the expense appears linear, the cost of management is influenced by process, procedures, and personnel, and thus may not be easily absorbed. With COTS technology, this approach is highly impractical for commercial enterprises to implement.

The Industrial Systems Automation (ISA99) working group shares a similar problem to the military in that sensor and supervisory control and data acquisition (SCADA) devices have become network capable. With the exposure of infrastructure to the Internet, cyberattacks against a nation state and large commercial enterprises have become more prevalent. The ISA99 working group has suggested that sensors, SCADA, and automation devices be deployed on a separate network infrastructure for security. However, there is no COTS solution for a single device supporting multiple networks simultaneously and securely.

Another area that could benefit from the secure transfer of data from multiple security domains is in the airline industry. Aircrafts are now equipped with communications equipment allowing both the airplane control systems to communicate with ground stations as well as the passengers of the plane to communicate with the open Internet. This exposes a vulnerability wherein passengers may be able to gain access to the local network containing the aircraft's control systems.

A traditional security approach for local area network (LAN) technology is known as virtual local area networks (VLANs), also known as IEEE 802.1Q. VLANs allow network administrators to "segment" their infrastructure, based on maintaining an access control list (ACL), attempting to control the flow of traffic across between segments. Since VLANs were designed for provisioning rather than security, VLANs are not considered sufficiently strong enough for protecting boundaries between multiple security domains. It is a well-known fact in the industry that LAN switches can be attacked such that the switch defaults back to a hub behavior exposing all traffic on all ports regardless of ACLs; furthermore, VLAN tagging can be used to subvert ACLs and hop from one VLAN to another before the traffic reaches an ACL capable device.

The Institute of Electrical and Electronics Engineers (IEEE) also created the IEEE 802.1X and 802.1AE (MACsec) for port level security and link layer security. However, MACsec does not secure multiple security domains; rather MACsec secures information between authenticated devices on the LAN. In spite of the encryption and authentication mechanisms it provides, end host addressing and layer 2 protocols are not secure. Attempting to service more than one level of security on the same infrastructure would still expose the higher security domains to various attacks from the lower domains. As an example, devices can still be identified by their media access control (MAC) address as they relate to the manufacturer's MAC address range, thus allowing an attacker to footprint the network and determine potential vulnerabilities based on device type.

SUMMARY

A first aspect of this disclosure provides a system for secure transfer of security domains across shared media. A first secure domain interface is associated with a first security domain. The first secure domain interface receives a secure network data packet and appends a first data frame. The first data frame includes a security domain identifier and internal routing data and generates an internal data packet. A first security interface receives the internal data packet and appends a second data frame to the internal data packet. The second data frame includes a source address for the first security interface and an authentication code and generates an open network data frame securely including a payload and routing information from the secure network data packet. The first security interface receives open network data frames, authenticates and extracts internal data packets, and routes internal data packets to the first secure domain interface. The first secure domain interface receives internal data packets, authenticates and extracts secure network data packets, and routes secure network data packets to secure network devices in the first security domain.

A second aspect of the disclosure provides a method for secure transfer of security domains across shared media. A secure network data packet is received in a first secure domain interface associated with a first security domain. A first data frame is appended to the secure data network packet. The first data frame includes a security domain identifier and internal routing data and generates an internal data packet. The internal data packet is received in a first security interface. A second data frame is appended to the internal data packet. The second data frame includes a source address for the first security interface and an authentication code and generates an open network data packet securely including a payload and routing information from the secure network data packet. The open network data packet is routed to a network device.

A third aspect of the disclosure provides a computer program product stored on a computer readable storage medium, which when executed by a computing system, provides a system for secure transfer of security domains across shared media. Program code receives a secure network data packet in a first secure domain interface associated with a first security domain. Program code appends a first data frame to the secure data network packet. The first data frame includes a security domain identifier and internal routing data to generate an internal data packet. Program code receives the internal data packet in a first security interface. Program code appends a second data frame to the internal data packet. The second data frame includes a source address for the first security interface and an authentication code to generate an open network data packet securely including a payload and routing information from the secure network data packet. Program code routes the open network data packet to a network device.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
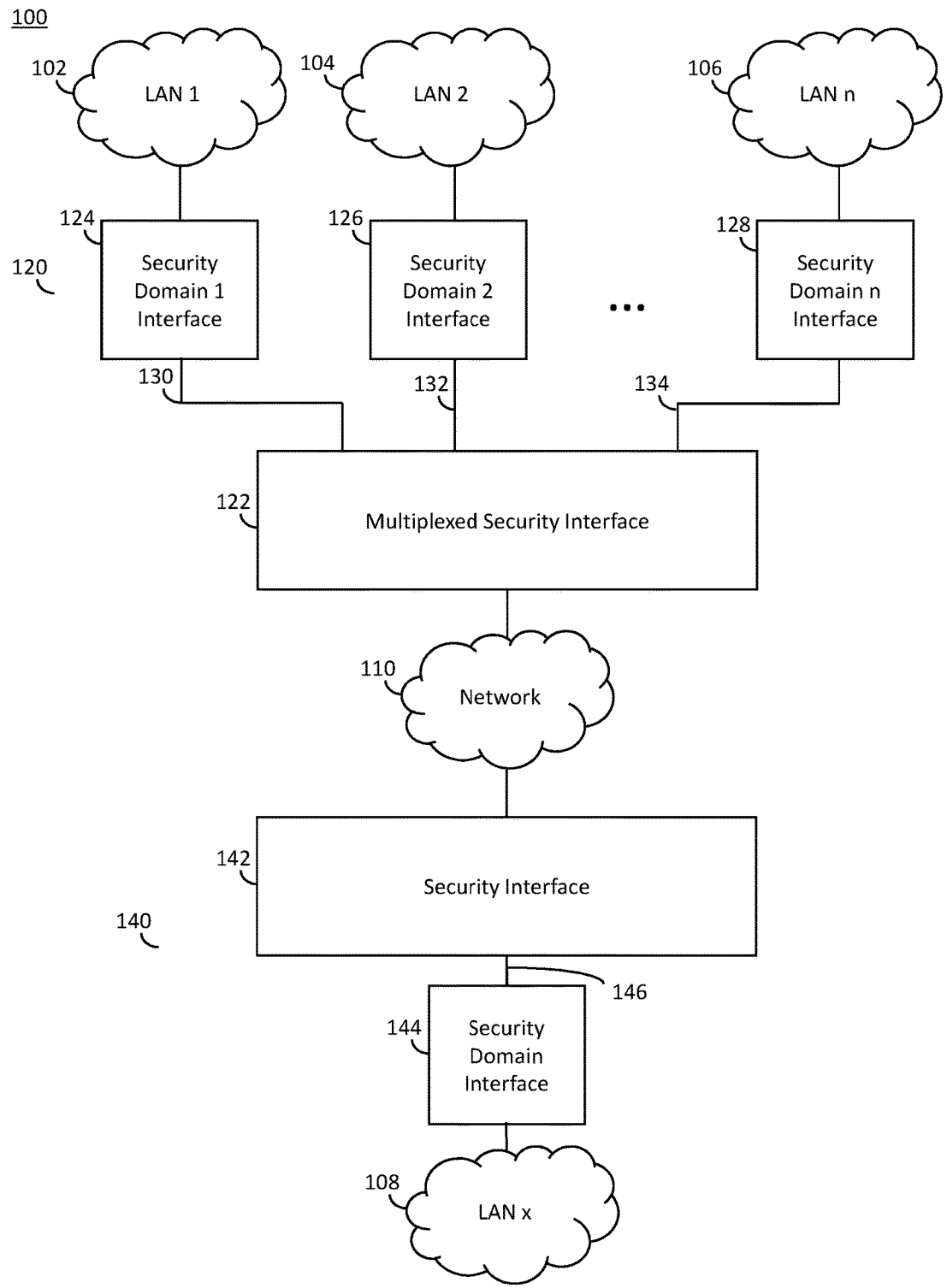
FIG. 1 shows a diagram of an example system for secure transfer of security domains across shared media.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring to FIG. 1, an example system 100 for secure transfer of security domains 102, 104, 106, 108 across shared network media 110. System 100 may securely bridge multiple networks of differing security domains through a shared medium. Security domains are typically local area networks (LANs) that are intended to isolate and limit network traffic only among network devices in the same security domain. Security domains may be enforced through physical layer isolation, software or virtual isolation at various communication layers, and/or combinations thereof. Many security domain implementations at the software or virtual level may be subject to vulnerabilities based on the communication and security protocols used. System 100 may include any number of security interface nodes 120, 140 interconnected by shared network media 110. System 100 enables secure transfer of secure domain data packets for each security domain 102, 104, 106, 108 such that the traffic from one security domain is invisible to all other security domains, even across shared network infrastructure. Traffic from different security domains may share a common transport media but traffic may not cross security domain boundaries nor have knowledge of the other domains' existence. System 100 may be implemented in various enterprise LAN devices to support new and existing architectures for enterprise LAN deployments. System 100 may also be applied at higher domain levels to include the distribution and core layer technologies.

Each security interface node 120, 140 may include a security interface (e.g., security interfaces 122, 142) and one or more security domain interfaces (e.g., security domain interfaces 124, 126, 128, 144). In some embodiments, a plurality of security domain interfaces 124, 126, 128 may be multiplexed through a single multiplexed security interface 122. In some embodiments, each security domain interface 144 may have a corresponding security interface 142. More complex security domain interface and security interface architectures are possible and a single system may employ a combination of single domain security interfaces, multiplexed security interfaces, and other configurations. Security interface nodes 120, 140 may be implemented as hardware devices, software packages, or combinations thereof. For example, security interface nodes 120, 140 may be packaged as an orthogonal network bridge compatible with both proprietary and off-the-shelf network devices operable with common transport media, such as those complying with Ethernet and similar open networking standards.

Security interface node 120 may use a multiplexed security interface 122 to support 2-$n$ security domains 102, 104, 106 with corresponding security domain interfaces 124, 126, 128. The plurality of security domain interfaces 124, 126, 128 may each be uniquely connected to common multiplexed security interface 122. Security domains 102, 104, 106 may include a plurality of independent LANs 1, 2 . . . n communicating through security domain interfaces 124, 126, 128. In some embodiments, security domain interfaces 124, 126, 128 may receive data frames from security domains 102, 104, 106 through a standard physical port with associated MAC address using conventional Ethernet level 2 protocols. Based on configuration, each security domain interface 124, 126, 128 may encrypt and attach an authentication signature, or simply attach an authentication signature to the native (secure) LAN traffic, for example, by adding an internal frame for routing traffic to multiplexed security interface 122 as an internal data packet. Each secure domain interface 124, 126, 128 may also perform an address lookup between the security domain address and an open network address for the peer device to which the final frame must be delivered. Security domain interfaces 124, 126, 128 may each communicate with multiplexed security interface 122 over independent high assurance communication paths 130, 132, 134. High assurance communication paths 130, 132, 134 may be Ethernet based or some other high speed communications interface. In some embodiments, high assurance communication paths 130, 132, 134 may be a non-Ethernet based communication protocol to eliminate internet based attaches on the security boundary, as may occur in network appliances such as firewalls and intrusion prevention systems. The secured traffic in the internal data packets may be forwarded to multiplexed security interface 122 for an additional signature (with or without additional encryption) and a security domain identifier as an open data frame around a secure payload. A final open data frame may be generated and transmitted via a network interface to shared network media 110. Multiplexed security interface 122 may include at least one Ethernet switch port and Ethernet level 2 protocols for sending traffic to other network devices. A receiving security interface, such as security interface 142, may reverse the process to deliver the original frame to the associated networking device on the same security domain.

Security interface node 140 may operate similarly to security interface node 120, but without the need to multiplex among multiple attached security domain interfaces. Security interface node 140 may include security interface 142 connected to security domain interface 144 by high assurance communications path 146. Security domain 108 may include LAN x communicating through security domain interface 144, where LAN x may be a separate security domain or another interface point to one more network devices associated with one of LAN 1, 2 . . . n.

Figure 2:
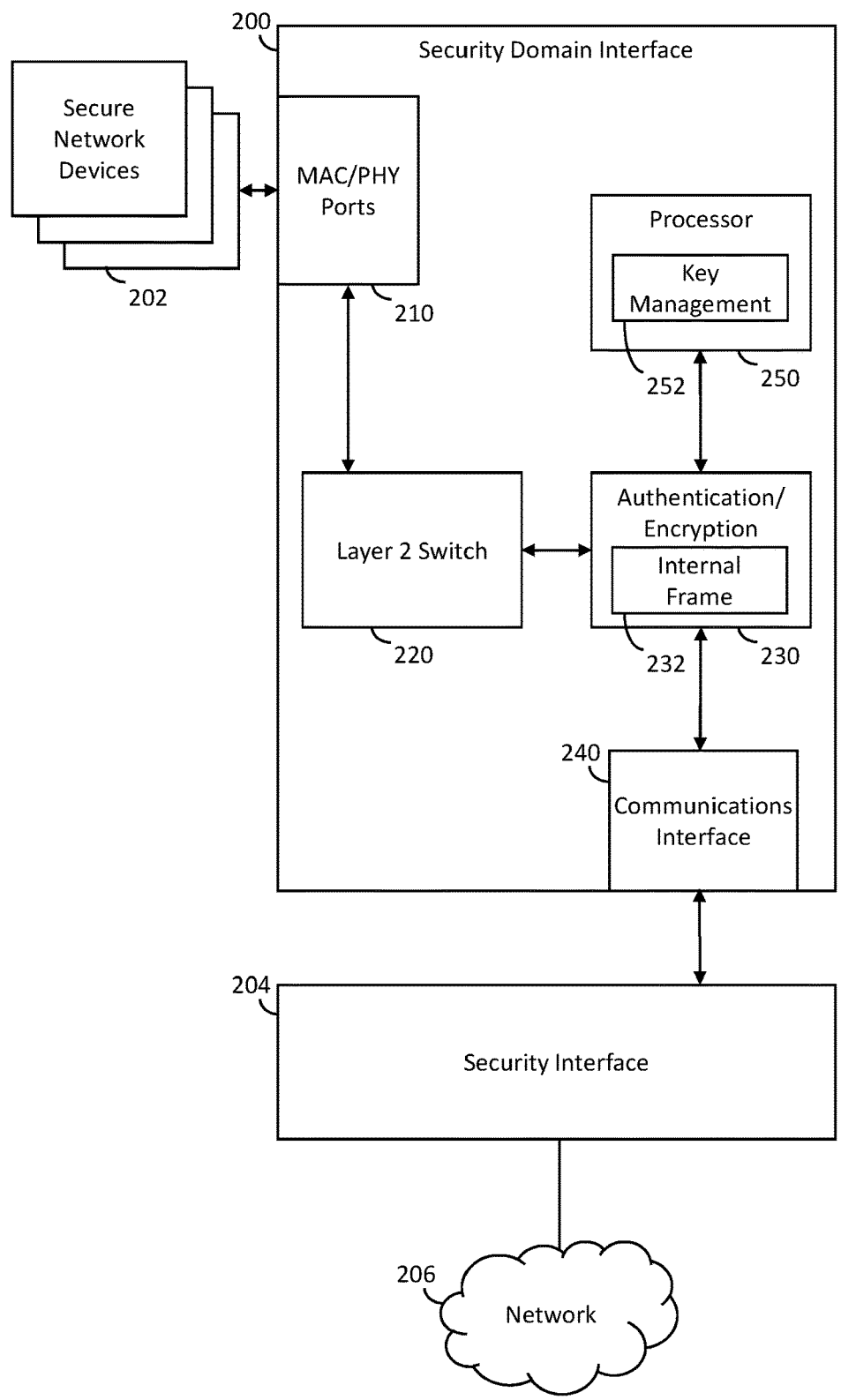
FIG. 2 shows a diagram of an example security domain interface.

Referring to FIG. 2, security domain interface 200 may communicate with a plurality of secure network devices 202 and security interface 204 for communication via open network 206. In some embodiments, security domain interface 200 may be implemented as a software program or module for a general purpose computing device. In some embodiments, security domain interface 200 may be implemented in hardware. Security domain interface 200 may include at least one physical port 210, such as a MAC addressable Ethernet switch port. Security domain interface 200 may also include a layer 2 switch 220, such as a layer 2 Ethernet switching integrated circuit. In some embodiments, security domain interface 200 may be compatible with one or more other layer 2 switching protocols for directing data packets, including proprietary communication protocols implemented within a given security domain. Security domain interface 200 may include an authentication/encryption module 230 for generating internal data packets and extracting secure data packets from internal data packets through appending and removing an internal data frame 232. In some embodiments, authentication/encryption module 230 may use an IEEE 802.1ae MACsec encryption, a Federal Information Processing Standards (FIPS) capable cipher engine, or a commercial off-the-shelf or government off-the-shelf cipher engine. Authentication/encryption module 230 may send and receive internal data packets through a communication interface 240. Communication interface 240 may be a dedicated and independent high assurance communications path between security domain interface 200 and security interface 204. Security domain interface 200 may also include a processor 250 for providing key management 252 in support of authentication/encryption module 230. In some embodiments, processor 250 is a central processing unit capable of managing programmable logic for key management, address lookup, and monitoring/management of other subsystems in security domain interface 200. In some embodiments, security domain interface 200 may further include an address lookup table, such as a MAC address translation table for associating secure domain data packet MAC addresses with MAC addresses appropriate for communications among security interfaces over open network 206.

In some embodiments, security domain interface 200 includes a plurality of physical ports 210 and traffic entering one of the ports may be switched (or forwarded) out of one of the other adjacent ports on the same switching fabric by layer 2 switch 220, such that security domain interface 200 may act as a standard switch or bridge for the security domain and connected secure network devices 202. Secure domain data packets that may be directed to a network device on the same security domain but connected via another security interface may be passed to authentication/encryption module 230 by layer 2 switch 220. The original frame from the secure domain data packet may be embedded in a new internal data packet by authentication/encryption module 230. In some embodiments, the original frame is encrypted in its entirety, though the original checksum or similar overhead in the frame related to the original transmission protocol may be removed as appropriate. The encrypted original frame may become the payload of the new internal data packet and internal data frame 232 may be appended to the original frame. For example, internal data frame 232 may include a security domain identifier or tag, a destination address, and header information related to encryption and/or the internal data protocol. In some embodiments, the destination address is determined by a call to a lookup table for converting the original destination MAC address to a MAC address related to the destination security interface. For example, Ethernet traffic destined for a broadcast MAC address (typically a broadcast IP packet or an Address Resolution Protocol request) results in a broadcast destination Ethernet MAC address. If the destination is known, as is the case for unicast and multicast IP traffic, then the lookup may return an open network MAC address corresponding to the secure domain destination MAC address.

Figure 3:
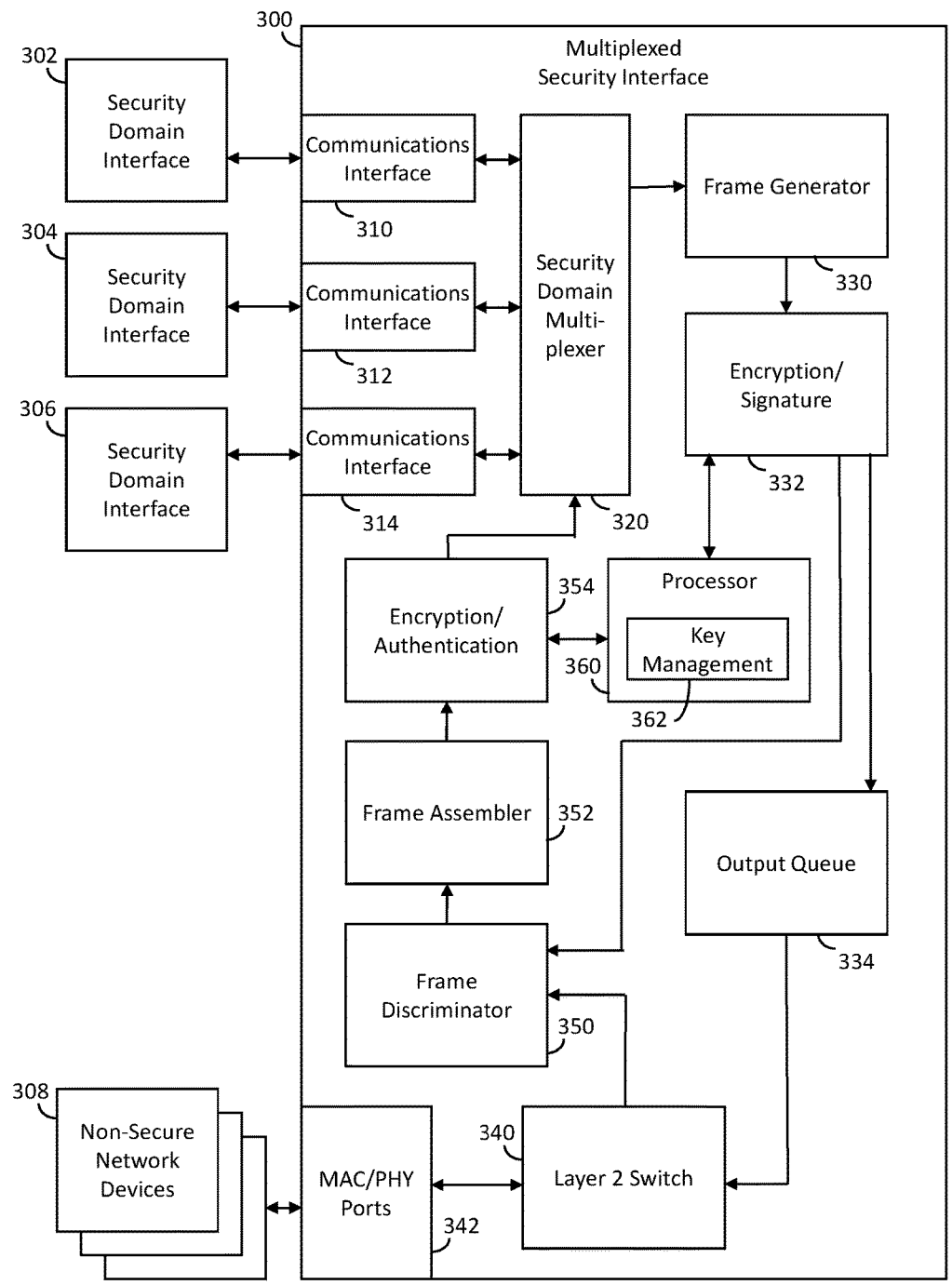
FIG. 3 shows a diagram of an example multiplexed security interface.

Referring to FIG. 3, example multiplexed security interface 300 may communicate with a plurality of security domain interfaces 302, 304, 306 and a plurality of non-secure network devices 308. In some embodiments, security domain interfaces 302, 304, 306 may operate substantially as described above regarding security domain interface 200. In some embodiments, multiplexed security interface 300 may be embodied in a hardware module housing separate transmit and receive data path logic. In some embodiments, some or all functions of multiplexed security interface 300 may be implemented in software running on hardware with compatible physical or virtual ports. In some embodiments, a plurality of transmit and receive data paths may be available within multiplexed security interface 300, but only a single transmit data path and single receive data path are shown in FIG. 3. Multiplexed security interface 300 is configured with a plurality of communication interfaces 310, 312, 314 corresponding to communication paths for security domain interfaces 302, 304, 306 and a security domain multiplexer 320 for directing internal data packets to frame generator 330. Communication interfaces 310, 312, 314 may be dedicated and independent high assurance communications paths between security domain interfaces 302, 304, 306 and multiplexed security interface 300. Alternate embodiments may include only a single communication interface for a single security domain interface and multiplexer 320 may be omitted such that the communication interface provides internal data packets directly to frame generator 330. Multiplexer 320 may include both multiplexing and de-multiplexing functions depending on the direction of data flow through communications interfaces 310, 312, 314 (transmitting or receiving). Multiplexer 320 may allow for multiplexing across a plurality of security domains and corresponding security domain interfaces 302, 304, 306. Three security domain interfaces 302, 304, 306 are shown by way of example only and multiplexer 320 may manage traffic from any number of security domain interfaces as practical for processing and bandwidth constraints. Multiplexer 320 may support the aggregation and separation of internal data packets according to their respective frames. In some embodiments, multiplexer 320 may include or interface with a quality of service output queue to prioritize traffic based on security domain identifiers and traffic type. In other embodiments, traffic may be handled in a first in first out (FIFO) or other queueing approach.

After multiplexing, the transmit path for multiplexed security interface 300 may include frame generator 330, encryption/signature module 332, output queue 334, layer 2 switch 340, and physical ports 342. In some embodiments, frame generator 330 may buffer the internal data packets and generate header metadata for an open network protocol, such as a level 2 Ethernet protocol. In some embodiments, encryption/signature module 332 encrypts some or all of the internal data packet frame and adds related metadata to the open network data frame header. In some embodiments, encryption/signature module 332 may use an encryption algorithm similar to an algorithm used by security domain interfaces 302, 304, 306 (as described above regarding FIG. 2). In some embodiments, encryption/signature module 332 may use one or more different encryption algorithms. In some embodiments, output queue 334 manages traffic priority in the transmit path using a quality of service prioritization algorithm. In some embodiments, layer 2 switch may be a layer 2 Ethernet switching integrated circuit. In some embodiments, multiplexed security interface 300 may be compatible with one or more other layer 2 switching protocols for directing data packets across an open network. In some embodiments, physical ports 342 may include a plurality of trunk ports for connecting to non-secure network devices 308 and/or other security interfaces using open network protocols. In some embodiments, physical ports may be typical of an Ethernet II or 802.3 based interface and/or support various other transmission media, including but not limited to WiFi, WiMAX, fiber channel, and/or proprietary RF waveforms.

The receive path for multiplexed security interface 300 may include physical ports 342, layer 2 switch 340, frame discriminator 350, frame assembler 352, and encryption/authentication module 354 providing internal data packets back to multiplexer 320. In some embodiments, physical ports 342 and layer 2 switch 340 for the receive path may be the same components used in the transmit path. In some embodiments, redundant physical ports and/or layer 2 switch may be used. In some embodiments, frame discriminator 350 discards any received data packets not complying with acceptable data frames and types and forwards open network data frames complying with acceptable data frames and types. In some embodiments, frame assembler 352 may aggregate and combine fragments of larger data packets or frames that have been fragmented according to level 2 protocols prior to being received in the receive path. Frame assembler 352 may forward the assembled open network data frames to encryption/authentication module 354 for decryption and extraction of internal data frames. Note that some internal data packets may not be destined for non-secure network devices 308 or another security interface accessible over the open network, and the transmit path may be truncated to pass open network data frames directly from encryption/signature module 332 to frame discriminator 350 in the receive path.

Both encryption/signature module 332 and encryption/authentication module 354 may be supported by one or more processors 360 and key management 362. Processor 360 may include a central processing unit capable of managing a variety of logic, processing, and data management functions and may handle various aspects of configuration for multiplexed security interface 300 and key control therein. In some embodiments, encryption/signature module 332 and encryption/authentication module 354 may be supported by separate processors and key management resources. In some embodiments, a single and/or interchangeable cryptographic modules may act as both encryption/signature module 332 and encryption/authentication module 354 depending on the direction of the data frames (transmit or receive). In some embodiments, encryption/signature module 332 and/or encryption/authentication module 354 may use an IEEE 802.1ae MACsec encryption, a Federal Information Processing Standards (FIPS) capable cipher engine, or a commercial off-the-shelf or government off-the-shelf cipher engine.

Figure 4:
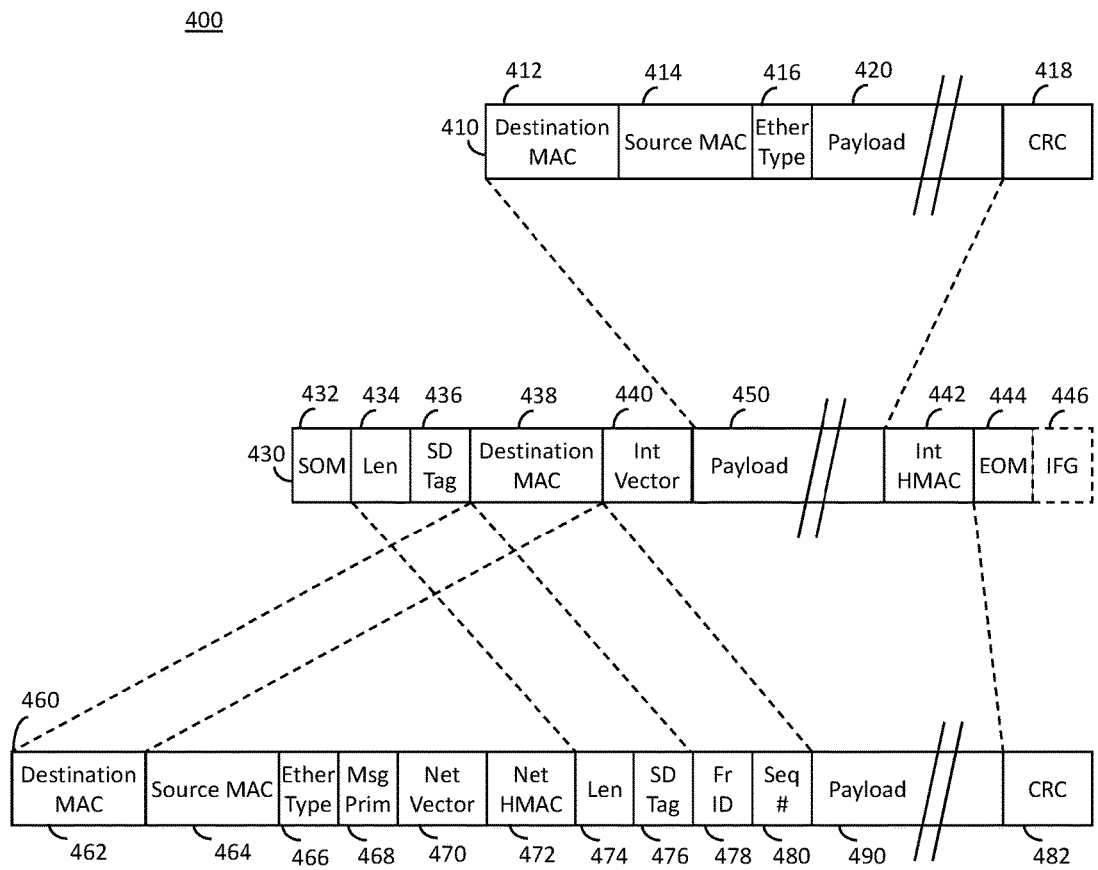
FIG. 4 shows a diagram of an example set of nested data packets or frames.

Referring to FIG. 4, an example set of nested data packets or frames 400 may be used for secure transfer of security domains across shared media. A secure domain data packet 410 may be received by a security domain interface according to level 2 protocols used by the relevant security domain. Secure domain data packet 410 may represent the security domain traffic of concern, the traffic the network owner wishes to protect. In some embodiments, a standard Ethernet frame format may be used, but other data frames and protocols may also be used. In the example shown, secure domain data packet 410 includes a destination MAC 412, a source MAC 414, an EtherType 416, and CRC 418 (cyclic redundancy check or checksum) framing a secure domain payload 420. In one embodiment, destination MAC 412 and source MAC 414 may each be 6 byte values, EtherType 416 may be a 2 byte value, CRC 418 may be a 4 byte value, and payload 420 may be 46-1500 bytes in length.

Internal data packet 430 may include the entire secure domain data packet 410, minus CRC 418 as internal payload 450 in the new internal data frame. CRC 418 and similar header fields that relate to the initial transmission integrity may be removed without impacting the addressing and data content of secure domain data packet 410 when it is reassembled and the communication protocols used within the security domain may add a new checksum or other redundancy check for the new transmission. Internal data packet 430 may include a new data frame appended to internal payload 450. The format of internal data packet 430 may not conform to Ethernet standards to reduce the risk that malicious Ethernet traffic is capable of traversing the communication boundary between security domain interfaces and related security interfaces, regardless of the source of the traffic. For example, internal data packet 430 may include header fields for start of message (SOM) 432, length 434, security domain (SD) tag 436, open network destination MAC 438, internal (Int) initialization vector 440 (or nonce), internal (Int) hash-keyed message authentication code (HMAC) 442, end of message (EOM) 444, and interframe gap (IFG) 446. Note that the example frame for internal data packet 430 assumes both internal authentication (Int HMAC 442) and internal encryption (Int Vector 440) are being used. In some embodiments, the frame for internal data packet 430 may also include a replay protection tag and/or a quality of service value for internal traffic management. In one embodiment, SOM 432, length 434, SD tag 436, EOM 444, and IFG 446 may each be 2 bytes, destination MAC 438 may be 6 bytes, Int Vector 440 and Int HMAC 442 may each be 4 bytes, and internal payload 450 may be 60-1515 bytes.

Open network data frame 460 may include most of internal data packet 430, including the entirety of its payload 450, encryption/authentication values (Int Vector 440 and Int HMAC 442), and other header information (length 434, SD tag 436, and destination MAC 438), but excluding header fields related solely to internal routing, such as SOM 432, EOM 444, and IFG 446. In some embodiments, payload 450 along with its encryption/authentication values (Int Vector 440 and Int HMAC 442) are incorporated into open network payload 490. In some embodiments, open network data frame 460 may be an Ethernet frame in accordance with a layer 2 Ethernet protocol. For example, destination MAC 462 and source MAC 464 may be standard header fields in an Ethernet frame. EtherType field 466 may be set to the L2EP type for a proprietary Layer 2 encryption protocol. The use of a proprietary EtherType enables traffic relevant to the system to co-exist but be distinguishable from other Ethernet traffic. Internal to these standard header fields may be a message primitive (Msg Prim) block 468 containing a message type field, and may contain additional fields such as counters, sequence numbers, fragment numbers, etc. The header for open network data frame 460 may also include a network (Net) initialization vector 470 and network (Net) HMAC 472 for encryption and authentication values related to open network payload 490. Length 474 may be inserted into the header in the event that open network payload 490 is less than 1,500 bytes. SD Tag 476 may be copied from header of internal data packet 450 and may define the security domain from which the internal data packet 450 was sourced. Frame identifier (Fr ID) 478 and sequence number (Seq #) 480 may be included in the frame in the event that the protocol may be configured for fragmentation and/or replay protection. A standard Ethernet checksum (CRC) 482 may be included at the end of the frame. Open network data frame 460 may be used to safely transport the security domain traffic over unsecure communications media. In one embodiment, destination MAC 462 and source MAC 464 may each be 6 bytes, EtherType 466, Msg Prim 468, length 474, and SD tag 476 may each be 2 bytes, Fr ID 478 and Seq #480 may each be 1 byte, Net vector 470, Net HMAC 472, and CRC 482 may each be 4 bytes, and open network payload 490 may be 68-1522 bytes.

Figure 5:
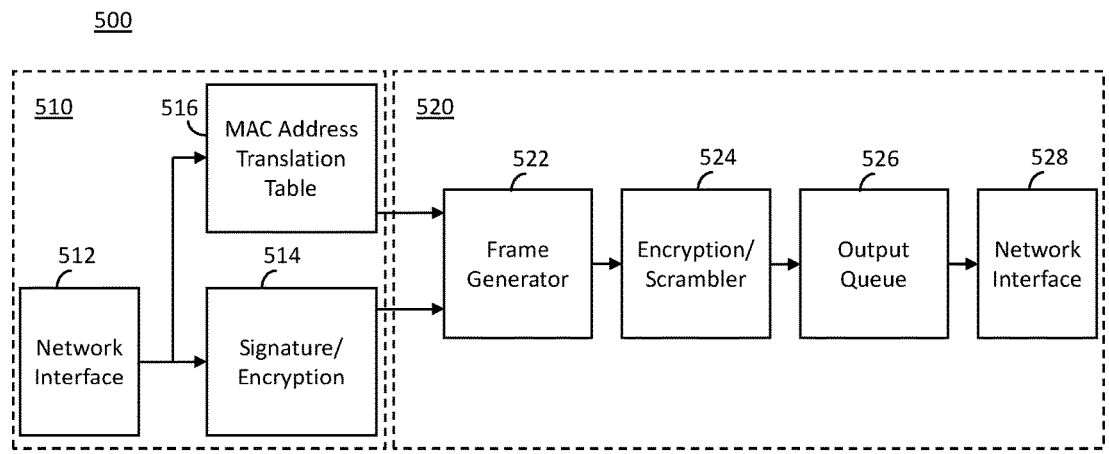
FIG. 5 shows a diagram of an example transmit path for a single security domain implementation.
Figure 6:
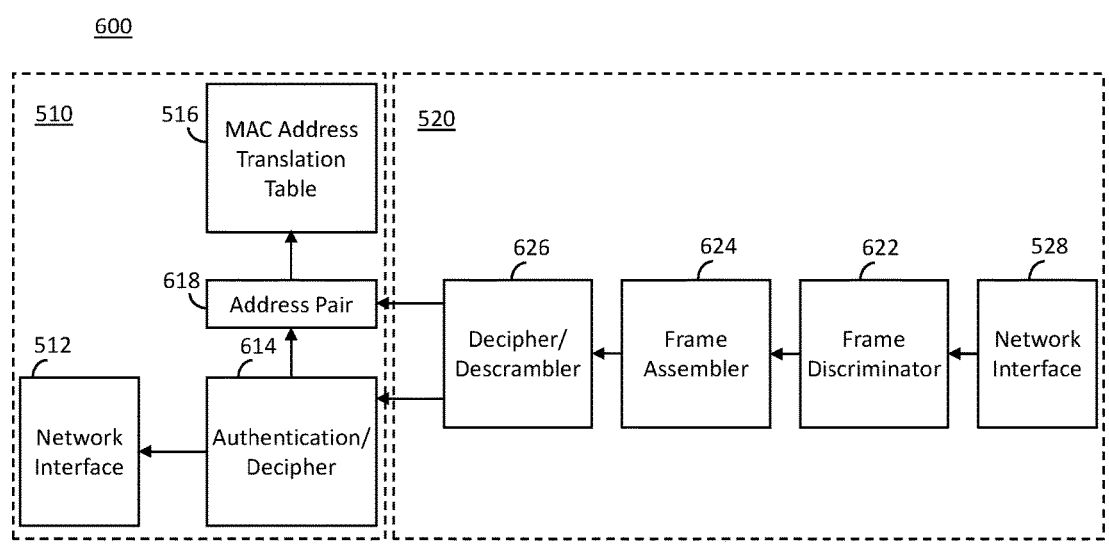
FIG. 6 shows a diagram of an example receive path for a single security domain implementation.

Referring to FIG. 5 and FIG. 6 show an example transmit path 500 and an example receive path 600 for a single security domain implementation. A domain security interface 510 may receive uncovered link layer traffic from a secure network, such as a security domain LAN, in the form of a secure domain data packet via network interface 512. Network interface 512 may include Ethernet switch fabric that may forward the original Ethernet frame (minus the checksum) to signature/encryption (cryptographic) module 514. Signature/encryption module 514 may perform an encryption of the entire layer 2 frame received by network interface 512. Signature/encryption module 514 may apply a signature in the form of a message authentication code (MAC) or hashed-message authentication code (HMAC). Signature/encryption module 514 may apply a replay protection number. MAC address translation table (MATT) 516 may provide a lookup for an open network destination MAC based on the destination MAC address included the original secure domain data packet. If the original destination MAC address is not stored in MATT 516, a default broadcast or commonly known multicast open network MAC address may be used. If the original destination MAC address is stored in MATT 516, the associated open network MAC address may be used. Signature/encryption module 514 may provide the signed and/or encrypted secure domain data packet as payload and signature/encryption module 514 and MATT 516 may provide various header fields for an internal data packet transmitted to security interface 520. In one embodiment, the open network destination MAC address from MATT 516, security domain tag or ID based on network adapter 512, a portion of all of the initialization vector and/or HMAC from signature/encryption module 514, and the signed and/or encrypted payload may be sent to frame generator 522 in security interface 520. A replay protection tag and/or a quality of service value may also be included in the frame of the internal data packet. In some embodiments, a processor and key management logic may assist network interface 512, signature/encryption module 514, and MATT 516 in generating and organizing the desired fields for the internal data packet frame and/or associated metadata.

Security interface 530 may receive the internal data packet via a dedicated high assurance communication path to frame generator 522. Frame generator 522 may create a new open network frame buffer to store the internal data packet post-processing. If the new open network frame will fit within the maximum transmit unit (MTU) of the open network protocol, then a single frame may be created. If the new open network frame will not fit within the MTU, then multiple open network frame buffers may be created in order to fragment the internal data packet. If two internal data packets arrive at approximately the same time, are destined for the same open network destination MAC address, and are small enough to fit within the same open network frame, frame generator 522 may combine two (or more) internal data packets. Frame generator 522 creates and appends header metadata for the open network data frame. For example, frame generator 522 may insert a source MAC address of security interface 520 and copy the open network destination MAC address from the internal data packet header. Frame generator 522 may insert an EtherType and message primitive type. Frame generator 522 my copy the length field and security domain tags from the internal data packet header. Frame generator 522 may insert a frame number and sequence number to support fragmenting and replay protection. Frame generator 522 may then forward the open network frame and payload to encryption/scrambler (cryptographic module) 524. Encryption/scrambler 524 may execute an HMAC algorithm over the payload of the internal data packet (the signed and/or encrypted contents of the original secure domain data packet) and the internal data packet initialization vector and/or HMAC. Encryption/scrambler 524 may encrypt the payload of the internal data packet and the internal data packet initialization vector and/or HMAC. Encryption/scrambler 524 may scramble some of the open network header fields that include data from the internal data packet header fields. In some embodiments, the scramble operation may occur prior to encryption. Encryption/scrambler 524 may insert or append open network initialization vectors and/or HMAC values into the new header based on the operations of encryption/scrambler 524. Encryption/scrambler 524 may send the new open network data frame to output queue 526, such as a quality of service output queue or a FIFO queue. In some embodiments, output queue 526 may be a quality of service module that schedules open network data frames based on security domains and quality of service levels and a configured policy. The output queue 526 forwards the next scheduled open network data frame to network interface 528 for transmission. For example, network interface 528 may include a layer 2 Ethernet switch fabric connected to appropriate physical interfaces for the desired peer security interface.

FIG. 6 shows the receive path 600, which may include at least some of the same components as transmit path 500 and/or may include redundant but similar components. Security interface 520 receives open network traffic, such as Ethernet traffic, from a non-secure network via network interface 528. Network interface 520 may determine wither received frames are destined for security interface 520. For example, open network data frames destined for different destinations may be forwarded if allowed, otherwise they may be dropped. Open network data frames destined for security interface 520 may be sent to frame discriminator 622. Frame discriminator 622 may discard any data packets not of the assigned EtherType, such as L2EP. Frame discriminator 622 may accept and forward any open network data frames of the correct EtherType to frame assembler 624. Frame assembler 624 may be responsible for aggregating and combining fragments of larger frames prior to forwarding to decipher/descrambler 626. For example, a timer may be applied to large frames to discard them in the event that one or more fragments fail to be received. Sequence numbers and frame numbers may be validated to avoid replay attacks and properly order data packets after their reception. Frame assembler 624 may forward complete frames or reassembled open network data frames to decipher/descrambler 626. Decipher/descrambler 626 may validate the data portion of the open network data frame against the MAC or HMAC within the frame. For example, decipher/descrambler 626 may decipher the data portion of the frame prior to HMAC validation and/or descramble portions of the header and internal data packet before or after decryption. Decipher/descrambler 626 may copy the authenticated, and optionally deciphered, frame into a new internal data packet frame buffer. Decipher/descrambler 626 may copy the length field from the open network data frame into the internal data packet header. Decipher/descrambler 626 may copy the SD tag from the open network data frame into the internal data packet header. Decipher/descrambler 626 may populate the destination MAC address into the internal data packet header, using the source MAC address from the open network data frame. Decipher/descrambler 626 may copy the authenticated (and optionally decrypted) data into the internal data packet header (internal vector and internal HMAC fields) and internal payload of the internal data packet. Decipher/descrambler 626 may forward the internal data packet to security domain interface 510.

Security domain interface 510 may receive the internal data packet via a dedicated communications path. Internal data packets with an invalid SD tag are dropped. Otherwise, authentication/decipher 614 may authenticate and decrypt the internal data packet. Frames that fail authentication or decryption may be dropped. Open network MAC address and security domain MAC address pairs 618 may be extracted from the internal data packet header and compared against MATT 516 to update the source open network MAC address to the source secure domain MAC address. If the source secure domain MAC address already exists in MATT 516, the source open network MAC address may be updated with the source of the current frame if different. If the source secure domain MAC address does not already exist in MATT 516, a new entry for MAC address pair 618 is added to the table. Authentication/decipher 614 may validate replay protection values based on address pair 618 data in MATT 516. Authentication/decipher 614 may forward the secure domain data packet to the secure domain via network interface 512.

The foregoing example transmit and receive paths 500, 600 may be based on single security domain configurations. For example, a device may be composed of a single security domain interface 510 and a single security interface 520. The security domain interface 510 may include a plurality of switch ports for connecting to one or more end point devices or other layer 2 networking devices. This configuration may be appropriate for SCADA systems for low latency and high integrity and authentication, with replay protection. In some single domain embodiments, the security domain interface 510 may perform a minimum HMAC function on the secure domain data packets. Encryption may be optional and controlled by user configuration. Security interface 520 supporting a single security domain may also perform minimum HMAC and framing of the new EtherType frame. Encryption in security interface 520 may also be optional and based on user configuration. The single security domain configuration may be used in a LAN where the administrator is more concerned with authentication and integrity of frames flowing between security interfaces as well as completely blocking all invalid traffic from offending sources.

Figure 7:
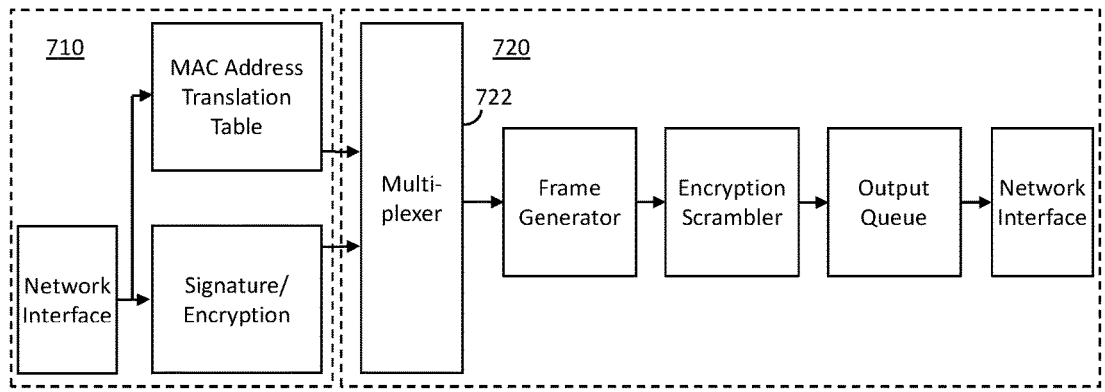
FIG. 7 shows a diagram of an example transmit path for a multiplexed security domain implementation.
Figure 8:
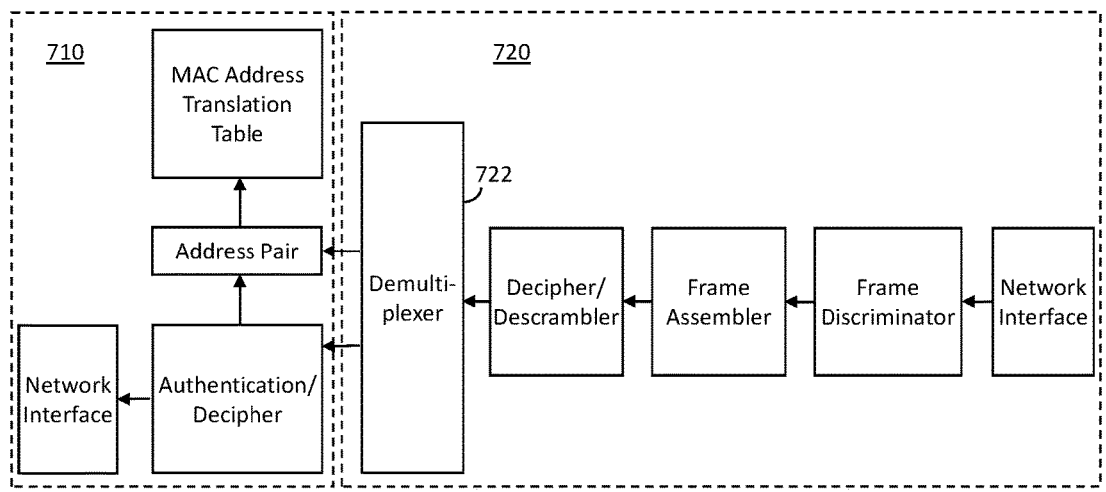
FIG. 8 shows a diagram of an example receive path for a multiplexed security domain implementation.

Referring to FIG. 7 and FIG. 8, show example transmit path 700 and example receive path 800 using a multiplexed security interface 720. While only a single security domain interface 710 is shown, it is understood that a plurality of such security domain interfaces may be connected to multiplexed security interface 720 to take advantage of the multiplexing capabilities of multiplexer 722 between security domain interface 710 and the transmit and receive data paths within multiplexed security interface 720.

Transmit path 700 operates substantially as described above with regard to transmit path 500 with the addition of multiplexer 722 in the transmit path. Multiplexed security interface 720 may receive internal data packets and associated metadata from one of a plurality of security domain interfaces, such as security domain interface 710. Multiplexer 722 may receive all frames from a plurality of interfaces, including security domain interface 710. Multiplexer 722 may prioritize the forwarding of internal data packets based upon any quality of service policy and/or age. In some embodiments, internal data packets from different security domains destined for the same open network destination MAC and small enough to be aggregated may be sent to the frame generator together.

Receive path 800 operates substantially as described above with regard to receive path 600 with the addition of multiplexer 722 in the receive path. Multiplexed security interface 720 may receive open network data frames destined for a plurality of security domain interfaces, such as security domain interface 710. Multiplexer 722 may receive all internal data packets processed from received open network data frames and addressed to a security domain accessible through multiplexed security interface 720 and forward the internal data packets based on the security domain tag in the header. Multiplexer 722 may check the SD tag for a valid security domain interface. If there is no security domain interface register to receive for the SD tag in the internal data packet, the message is dropped. If there is a security domain interface register to receive for the SD tag in the internal data packet, the internal data packet is transmitted to the appropriate security domain interface. Multiplexer 722 may prioritize the forwarding of internal data packets based upon any quality of service policy and/or age.

The foregoing example transmit and receive paths 700, 800 may be based on multiple security domain configurations. For example, the device may be composed of a plurality of security domain interface boards, one per security domain, and a plurality of security interface boards, one per network interface card. Each security domain interface may include a plurality of switch ports for connection to end point devices or other layer 2 networking devices. Each security domain interface may include a process for control and management of configurations and key management. Multiple security domain configurations may be used in LANs where the administrator is more concerned with confidentiality, integrity, and authentication of frames flowing between security interfaces from different security domains, as well as completely blocking all invalid traffic from offending sources. This may be deployed where an enterprise supports two or more security domain LANs with differing levels of security. For example, this configuration may be used in airline communications systems to block user WiFi traffic from crossing into cockpit communications, as well as government communications systems for various departments. This may also be used in private industry where the proprietary data needs to be hidden and protected from unauthorized internal agents as well as external agents.

Figure 9:
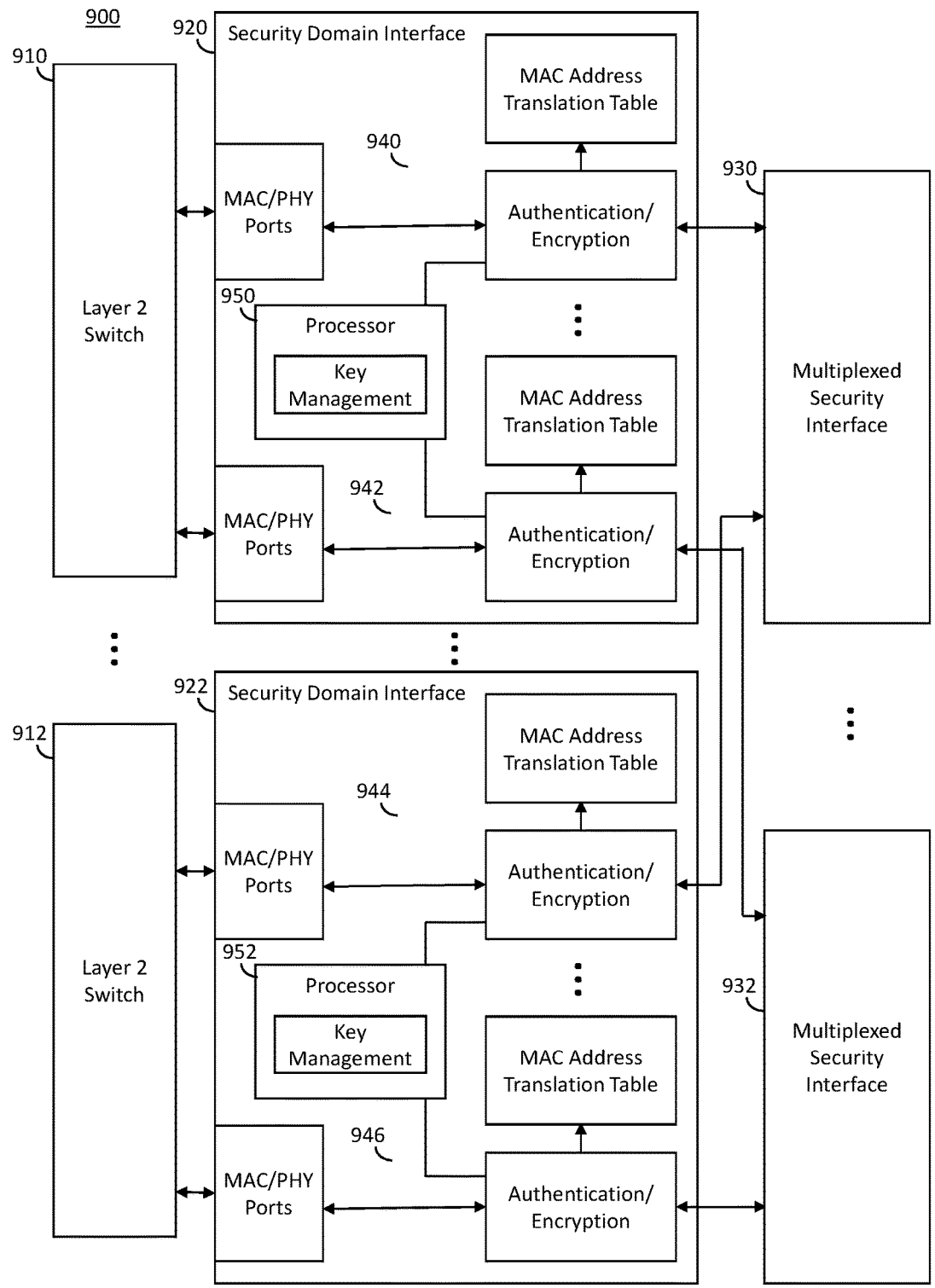
FIG. 9 shows a diagram of an example network switch architecture.

Referring to FIG. 9, an expandable network switch architecture for system 900 provides a plurality of layer 2 switches 910, 912, a plurality of security domain interfaces 920, 922, and a plurality of multiplexed security interfaces 930, 932. Within security domain interfaces 920, 922, a plurality of security domain data paths 940, 942, 944, 946 may be expanded to support additional security domains, while maintaining some shared resources, such as processors 950, 952. This configuration may provide an administrator with the ability to reduce LAN infrastructure components by a factor of N, where N is the number of security domain interfaces hosted in system 900. System 900 supports one security domain interface board per security domain switching fabric. For each trunked switch port on the switch fabric, a separate data path is provided on the security domain interface board. For each data path on each security domain interface board, a single security interface board is added to service on data stream interface per security domain interface board. This design allows for redundancy as well as seamless support of layer 2 protocols, such as address resolution protocol and spanning tree protocol.

Figure 10:
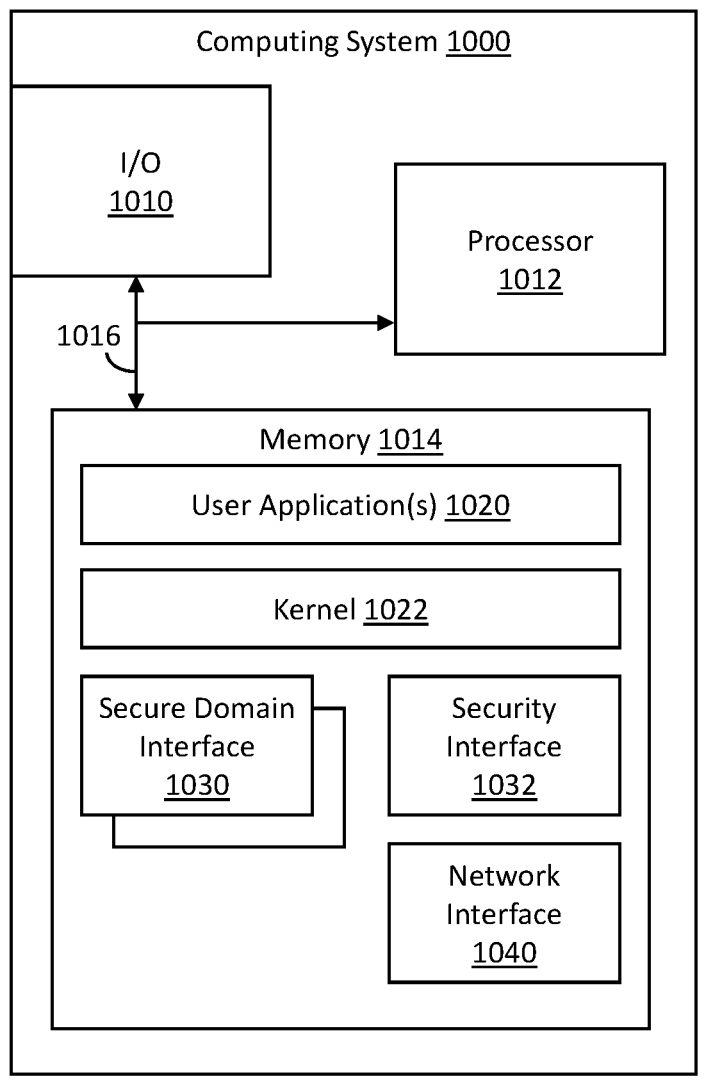
FIG. 10 shows a diagram of an example device driver implementation.

Referring to FIG. 10, an example device driver implementation is shown on computing system 1000. For example, a Linux/Unix Kernel module or device driver, MS Windows DLL or device driver, or other similar computer program product for a standalone wireless capable mobile device (laptop, tablet, etc.) may use the device driver configuration. This may allow a mobile or other computing device to communicate through a device driver or tap interface set as a default gateway that allows the device to communicate with one or more security domains. One or more security domain interfaces 1030 and at least one security interface 1032 utilize a network interface 1040 for securely interacting with one or more security domains.

Security domain interfaces 1030 and security interface 1032 may be hosted as a portion of the operating environment of computing system 1000. The security interface 1032 and one or more security domain interfaces 1030 may operate as separate devices to ensure separation of cipher engines (separation of duties), but may be hosted by computing system 1000 in the same order as would be found in hardware. The program code for security domain interfaces 1030 may be presented to computing system 1000 as a device and, more specifically, a gateway device for computing system 1000. Security domain interfaces 1030 may accept all internet protocol (IP) traffic to be processed by the data path through security domain interfaces 1030 and security interface 1032. The output of security interface 1032 may be attached to network interface 1040, such as an Ethernet interface, WiFi, Bluetooth, etc.

Computing system 1000 may provide computing resources (I/O 1010, processor 1012, memory 1014, and bus 1016) for executing program code for security domain interfaces 1030 and security interface 1032. In some embodiments, computing system 1000 is a general purpose computing devices, such as a personal computer, work station, mobile device, or an embedded system in an industrial control or measurement system (using general purpose computing components and operating systems). Computing system 1000 may include at least one memory 1014, processor 1012, and input/output (I/O) interface 1010 interconnected by a bus 1016. Further, computing system 150 may include communication with external I/O device/resources and/or storage systems, including connected system. In general, a processor executes computer program code, such as program code for security domain interfaces 1030 and security interface 1032, that is stored in memory and/or a storage system. While executing computer program code, the processor 1012 can read and/or write data to/from memory 1014, storage systems, and I/O devices. The bus 1016 provides a communication link between each of the components within computing system 1000. I/O devices may comprise any device that enables a user to interact with computing system 1000 (e.g., keyboard, pointing device, display, etc.). Computing system 1000 is only representative of various possible combinations of hardware and software. For example, the processor may comprise a single processing unit, or be distributed across one or more processing units in one or more locations, e.g., on a client and server. Similarly, memory and/or storage systems may reside at one or more physical locations. Memory and/or storage systems can comprise any combination of various types of non-transitory computer readable storage medium including magnetic media, optical media, random access memory (RAM), read only memory (ROM), etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
a first secure domain interface in communication with a first local area network (LAN), the first secure domain interface:
receiving a first secure domain data packet from the first LAN, and
encapsulating the first secure domain data packet within a first internal payload of a first internal data packet, the first internal data packet including the first internal payload, a length associated with the first internal data packet, a security domain tag associated with the first internal data packet, and an internal hash-keyed message authentication code (HMAC) associated with the first internal data packet to generate the first internal data packet; and
a first security interface in communication with the first secure domain interface for:
receiving the first internal data packet,
encapsulating the first internal data packet within a first open network data frame, the first open network data frame including a source media access control (MAC) address on a common transport media for the first security interface, a network HMAC to generate the first open network data frame, the length associated with the first internal data packet, the security domain tag associated with the first internal data packet, and a first open network payload securely including the first internal payload of the first internal data packet and the internal HMAC of the first internal data packet, and
transmitting the first open network data frame on the common transport media,
wherein the first security interface receives a second open network data frame including a second open network payload from the common transport media, authenticates and extracts a second internal data packet including a second internal payload, and forwards the second internal data packet including the second internal payload to the first secure domain interface, and
wherein the first secure domain interface receives the second internal data packet including the second internal payload, authenticates and extracts a second secure domain data packet included in the second internal payload, and transmits the second secure domain data packet to a secure network device in the first LAN.

2. The system of claim 1, further comprising at least a second secure domain interface associated with a second LAN, the second secure domain interface:
receiving a third secure domain data packet from the second LAN, and
encapsulating the third secure domain data packet within a third internal payload of a third internal data packet, the third internal data packet including the third internal payload, a length associated with the third internal data packet, a security domain tag associated with the third internal data packet, an internal HMAC associated with the third internal data packet to generate the third internal data packet,
wherein the first security interface further comprises a multiplexer configured to at least one of receive or send at least one of the first internal data packet or the third internal data packet to the first secure domain interface and the second secure domain interface.

3. The system of claim 1, wherein each of the first secure domain interface and the first security interface includes at least one Ethernet switch port and a layer 2 Ethernet switch for receiving and sending at least one of the second secure domain data packet or the third secure domain data packet to the secure network device in the first LAN.

4. The system of claim 1, wherein the first security interface includes at least one Ethernet switch port and a layer 2 Ethernet switch for receiving and sending the first open network data frame to non-secure network devices.

5. The system of claim 1, further comprising a second security interface configured to:
receive the first open network data frame from the first security interface,
authenticate and extract the first internal data packet, and forward the extracted, first internal data packet to a second secure domain interface associated with a second LAN.

6. The system of claim 1, wherein the first secure domain interface encrypts the first secure domain data packet encapsulated as the first internal payload of the first internal data packet and the first internal data packet further includes an internal initialization vector.

7. The system of claim 6, wherein the first security interface encrypts the first internal data packet encapsulated as the first internal payload of the first open network data frame and the first open network data frame further includes a network initialization vector.

8. A method comprising:
receiving a first secure domain data packet in a first secure domain interface associated and in communication with a first local area network (LAN);
encapsulating the first secure domain data packet within a first internal payload of a first internal data packet, the first internal data packet including the first internal payload, a length associated with the first internal data packet, a security domain tag associated with the first internal data packet, and an internal hash-keyed message authentication code (HMAC) associated with the first internal data packet to generate the first internal data packet message;
receiving the first internal data packet in a first security interface;
encapsulating the first internal data packet within a first open network data frame, the first open network data frame including a source media access control (MAC) address on a common transport media for the first security interface a network HMAC code to generate the first open network data frame, the length associated with the first internal data packet, the security domain tag associated with the first internal data packet, and a first open network payload securely including the first internal payload of the first internal data packet and the internal HMAC of the first internal data packet; and
transmitting the first open network data frame to a network device on the common transport media.

9. The method of claim 8, further comprising:
receiving a second open network data frame including a second open network payload in the first security interface from the common transport media;

authenticating and extracting a second internal data packet including a second internal payload from the second open network payload of the second open network data frame;

forwarding the second internal data packet including the second internal payload to the first secure domain interface;

receiving the second internal data packet including the second internal payload in the first secure domain interface;

authenticating and extracting a second secure domain data packet included in the second internal payload of the second internal data packet; and transmitting the second secure domain data packet to a secure network device in the first LAN.

10. The method of claim 8, further comprising:

receiving a third secure domain data packet in a second secure domain interface associated with a second LAN;

encapsulating the third secure domain data packet within a third internal payload of a third internal data packet, the third internal data packet including the third internal payload, a length associated with the third internal data packet, a security domain tag associated with the third internal data packet, an internal HMAC associated with the third internal data packet to generate the third internal data packet;

receiving the third internal data packet in the first security interface, wherein the first security interface further comprises a multiplexer configured to at least one of receive or send at least one of the first internal data packet or the third internal data packet to the first secure domain interface and the second secure domain interface.

11. The method of claim 8, wherein transmitting the first open network data frame to the network device on the common transport media includes sending the first open network data frame to a non-secure network device.

12. The method of claim 8, wherein transmitting the first open network data frame to the network device includes:

sending the first open network data frame to a second security interface that receives the first open network data frame from the first security interface, authenticates and extracts the first internal data packet, and forwards the extracted, first internal data packet to a second secure domain interface associated with a second LAN.

13. The method of claim 8, further comprising:

converting between secure network MAC addresses and common transport media MAC addresses in the first secure domain interface, wherein the first internal data packet further includes the common transport media MAC address.

14. The method of claim 8, further comprising:

encrypting the first secure domain data packet encapsulated as the first internal payload of the first internal data packet, wherein the first internal data packet further includes an internal initialization vector.

15. The method of claim 14, further comprising:

encrypting the first internal data packet encapsulated as the first internal payload of the first open network data frame, wherein the first open network data frame further includes a network initialization vector.

16. A computer program product stored on a non-transient computer readable storage medium, which when executed by a computing system, provides a system for secure transfer of security domains across shared media, the program product comprising:

program code that receives a first secure domain data packet in a first secure domain interface associated and in communication with a first local area network (LAN);

program code that encapsulates the first secure domain data packet within a first internal payload of a first internal data packet, the first internal data packet including the first internal payload, a length associated with the first internal data packet, a security domain tag associated with the first internal data packet, and an internal hash-keyed message authentication code (HMAC) associated with the first internal data packet to generate the first internal data packet;

program code that receives the first internal data packet in a first security interface;

program code that encapsulates the first internal data packet within a first open network data frame, the first open network data frame including a source media access control (MAC) address on a common transport media for the first security interface, a network HMAC to generate the first open network data frame, the length associated with the first internal data packet, the security domain tag associated with the first internal data packet, and a first open network payload securely including the first internal payload of the first internal data packet and the internal HMAC of the first internal data packet; and program code that transmits the first open network data frame to a network device on the common transport media.

17. The program product of claim 16, further comprising:

program code that receives a second open network data frame including a second open network payload in the first security interface from the common transport media;

program code that authenticates and extracts a second internal data packet including a second internal payload from the second open network payload of the second open network data frame program code that forwards the second internal data packet including the second internal payload to the first secure domain interface;

program code that receives the second internal data packet including the second internal payload in the first secure domain interface;

program code that authenticates and extracts a second secure domain data packet included in the second internal payload of the second internal data packet; and program code that transmits the second secure domain data packet to a secure network device in the first LAN.

18. The system of claim 1, wherein the first secure data frame encapsulated within the first internal payload of the first internal data packet includes:

a secure destination MAC address;
a secure source MAC address;
at least one EtherType; and
a secure domain payload.

19. The system of claim 18, wherein the first secure domain interface includes a MAC address translator including a MAC address translation table, the MAC address translator configured to:

determine if the secure destination MAC address included in the first secure data frame matches one of a plurality of open network destination MAC addresses included in the MAC address translation table;

include the matched, open network destination MAC address in first internal data packet in response to determining the secure destination MAC address of the first secure data frame matches an open network destination MAC address included in the MAC address translation table;

identify a secure source MAC address based on a received, open network source MAC address included in a second open network data frame; and update the MAC address translation table to include the identified, secure source MAC address, based on the received, open network source MAC address included in the second open network data frame.

20. The system of claim 19, wherein the first open network data frame includes the matched, open network destination MAC address included in the first internal data packet.

* * * * *